United States Patent

Yoshida et al.

[11] Patent Number: 5,913,055
[45] Date of Patent: Jun. 15, 1999

[54] DATA DRIVEN INFORMATION PROCESSOR FOR EXECUTING AND DEBUGGING A DATA FLOW GRAPH WITHOUT REVISING THE DATA FLOW GRAPH

[75] Inventors: Shinichi Yoshida; Tsuyoshi Muramatsu, both of Nara, Japan

[73] Assignee: Sharp Kabushiki Kaisha, Osaka, Japan

[21] Appl. No.: 08/718,258

[22] Filed: Sep. 20, 1996

[30] Foreign Application Priority Data

Sep. 20, 1995 [JP] Japan ..................................... 7-241497

[51] Int. Cl.$^6$ ..................................................... G06F 15/82
[52] U.S. Cl. .......................... 395/580; 395/581; 395/583; 395/390; 395/800.25; 395/800.26
[58] Field of Search ..................................... 395/580–581, 395/582, 583, 388–389, 390–392, 800.25, 800.26, 800.27

[56] References Cited

U.S. PATENT DOCUMENTS

| | | | |
|---|---|---|---|
| 5,038,348 | 8/1991 | Yoda et al. | 395/183.14 |
| 5,165,036 | 11/1992 | Miyata et al. | 395/800.25 |
| 5,268,902 | 12/1993 | Onozaki | 370/236 |
| 5,369,775 | 11/1994 | Yamasaki et al. | 395/800.25 |
| 5,404,539 | 4/1995 | Onozaki | 395/800.26 |
| 5,404,558 | 4/1995 | Okamoto | 395/800.27 |
| 5,454,115 | 9/1995 | Okamoto | 395/800.25 |
| 5,511,215 | 4/1996 | Terasaka et al. | 395/800.25 |
| 5,630,151 | 5/1997 | Muramatsu et al. | 395/800.25 |
| 5,745,723 | 4/1998 | Matsuo et al. | 395/388 |

FOREIGN PATENT DOCUMENTS 6162228   6/1994   Japan ............................... G06F 15/82

Primary Examiner—Krisna Lim
Assistant Examiner—Bharat Barot

[57] ABSTRACT

A data driven information processor includes a main body processing portion for processing a data packet, a start register storing information for use in determining whether to continue to process the data packet output from the main body processing portion or output externally, and a branch portion for determining whether to provide the output of the main body processing portion to the main body processing portion or to the output processing portion based on the content of the register and the content of the data packet and branching the data packet. The branch portion has a duplicating function to produce a duplicate of the data packet for provision to the output processing portion if it determines the data packet should continue to be processed by the main body processing portion.

10 Claims, 17 Drawing Sheets

DATA DRIVEN INFORMATION PROCESSOR FOR EXECUTING AND DEBUGGING A DATA FLOW GRAPH WITHOUT REVISING THE DATA FLOW GRAPH

CROSS REFERENCE TO RELATED APPLICATION

This application is related to application Ser. No. 08/613,671, filed Mar. 11, 1996, now U.S. Pat. No. 5,794,064, commonly assigned with the present invention.

BACKGROUND OF THE INVENTION

1. Field of the Invention

The present invention relates generally to data driven information processors executing a data flow graph, and more particularly to a data driven information processor capable of readily debugging a data flow graph to be executed.

2. Description of the Related Art

In a data driven processor, processings proceed in parallel based on the simple rule "if all necessary data for a processing is collected and resources for operation necessary for the processing are allocated, the processing is executed". Data is transmitted by a data packet together with its destination information.

FIG. 1 is a block diagram showing a conventional data driven information processing system for video signal processing. Referring to FIG. 1, the conventional system includes a data driven processor 61, and an image memory portion 11. Image memory portion 11 includes a memory interface 2 and an image memory 3.

Data driven processor 61 includes input ports IA, IB and IV, and output ports OA, OB and OV. Input ports IA and IB are connected with transmission paths 7 and 8, respectively, and provided with a data packet including a video signal to be processed. Input port IV is connected with a transmission path 5, and provided with a data packet including a result of accessing image memory 3 executed in image memory portion 11. Output ports OA and OB are connected with transmission paths 9 and 10, respectively, and provided with a data packet including data based on a result of processing executed in the system. Output portion OV is connected with a transmission path 4, and a data packet including data for accessing image memory portion 11 is output to memory interface 2.

Memory interface 2 and image memory 3 are connected with each other through a memory access control line 6. Data transmitted on memory access control line 6 is also a data packet.

FIG. 2 shows an arrangement of the field of a data packet transmitted through data transmission paths 7–10 within the system shown in FIG. 1 by way of illustration. A data packet 120 input/output to/from processor 61 includes an instruction code 122 indicating the content of processing in the processor, a processor number 124 for uniquely specifying a data driven processor to process the data packet in the system, a node number 126 for uniquely specifying an instruction to be executed on the processor to process the data packet, a generation number 128, i.e., an identifier attached based on the order of input time series, and data 130. Generation number 128 is used in queuing for data in processor 61, and has a meaning of an address to image memory 3 for memory interface 2.

Note that as shown in FIG. 2, in this example, instruction code 122, processor number 124, node number 126, generation number 128 and data 130 have bit lengths of 8 bit, 9 bit, 6 bit, 24 bit, and 12 bit, respectively but the bit length of each field and the packet length of the entire data packet may take other values.

The system shown in FIG. 1 operates as follows in data processing. A signal input packet having a generation number is provided in time series to processor 61 through input port IA or IB. Processor 61 stores a data flow program for video processing. Processor 61 processes provided data based on the program and outputs the result of processing through one of output ports OA and OB.

If image memory 3 should be accessed (for referring to/updating of data stored in image memory 3) a data packet storing a request of accessing image memory 3 is output to image memory 11 through the output port OB of processor 61. Memory interface 2, upon receiving the request of accessing accesses image memory 3 through memory access control line 6, and provides a data packet storing the resultant data to the input port IV of processor 61 through transmission path 5. Processor 61 receives the data packet through input port IV and continues the processing based on the above-described data flow program.

FIG. 3 is a block diagram showing a conventional data driven processor 61 for use in a data driven system for video processing. Referring to FIG. 3, the conventional data driven processor 61 includes an input processing portion 17 having its input terminal connected with input ports IA and IB, a junction portion 12, a main body processing portion 13 storing a data flow program and executing a processing based on the program, a branch portion 14, an output processing portion 15 having its output terminal connected with output ports OA and OB, a PE# register 16 for storing an identification number PE# for uniquely identifying processor 61 of interest within the system in a network, and a branch control parameter register group 18 storing branch conditions for determining whether to output a data packet to output port OA or OB.

Input processing portion 17 receives a data packet input through input port IA or IB, compares a processor number in the input packet and the content of PE# register 16 and selectively provides the data packet to junction portion 12 or output processing portion 15 based on the result of comparison. More specifically, if the processor number in the input data packet and the content of PE# register 16 are in coincidence, input processing portion 17 determines that the data packet is directed to its processor, and provides the packet to junction portion 12. If no coincidence is found, input processing portion 17 determines that the packet is directed to another processor, and provides the packet to output processing portion 15.

Junction portion 12 joins the data packet provided from input processing portion 17 with a data packet provided from branch portion 14 which will be described later, and provides the resultant packet to main body processing portion 13. Main body processing portion 13 processes the data packet provided from junction portion 12 based on a prescribed data flow program. At the time, if image memory 3 (shown in FIG. 1) should be accessed, main body processing portion 13 outputs the packet to image memory portion 11 through output port OV. A data packet resulting from the processing in image memory portion 11 is received by data driven processor 61 through input port IV.

Branch portion 14 receives the data packet output from main body processing portion 13 and selectively provides the data packet to output processing portion 15 or junction portion 12 based on whether or not the processor number in the data packet and the content of PE# register 16 are in coincidence. More specifically, if the processor number in the input data packet coincides with the content of PE# register 16, branch portion 14 provides the data packet to junction portion 12. If no coincidence is found, branch portion 14 provides the input data packet to output processing portion 15.

Output processing portion 15 receives the data packet provided from branch portion 14 or input processing portion 17, and selectively outputs the data packet to one of output portions OA and OB based on a branch condition set for branch control parameter register group 18 by referring to the processor number or the generation number in the input data packet.

Such a data driven processor having the arrangement as described above and shown in FIG. 3 is for example disclosed by Japanese Patent Laying-Open No. 6-162228. In the data driven processor in the disclosure, three kinds of registers including an ID parameter register (PE), a branch comparison data parameter register (RD), and a branch comparison mask parameter register (RM) are prepared as branch control parameter register group 18. Among them, ID parameter register (PE) is considered to be equivalent to PE# register 16 shown in FIG. 3, and therefore the device shown in FIG. 3 would be equivalent to the data flow processor shown in Japanese Patent Laying-Open No. 6-162228. As a result, as branch control parameter register groups 18, provision of two kinds of registers, the branch comparison data parameter register and the branch comparison mask parameter register should be sufficient. According to Japanese Patent Laying-Open No. 6-162228, the branch condition may be expressed as follows.

(RM. and. pe#).exor. (RM. and. RD)  (1)

wherein RM and RD are values stored in branch comparison mask parameter register RM and branch comparison data parameter register RD, respectively, pe# is a processor number in the input packet to output processing portion 15, and operators, and, exor represent a bit-based logical multiplication and a bit-based exclusive OR.

If the operands (RM. and. pe#) and (RM. and.RD) in the exor operation are in coincidence, the value of expression (1) becomes zero. In this case, output processing portion 15 outputs the input data packet onto transmission path 9 through output port DA. If the operands ((RM. and. pe#) and (RM. and. RD) in the exor operation are not in coincidence, the result of expression (1) will not be zero. In this case, output processing portion 15 outputs the input data packet onto transmission path 10 through output port OB.

FIG. 4 shows the functional configuration of branch portion 14 in the conventional data driven processor 61. Referring to FIG. 4, branch portion 14 includes a branch destination determination portion 142 for comparing a processor number in a data packet provided from main body processing portion 13 and the content of PE# register 16 and outputting the result of determination, and a selector 141 controlled by the output of branch destination determination portion 142 for selectively outputting the data packet provided from main body processing portion 13 to junction portion 12 through one terminal A or to output processing portion 15 through the other terminal B.

Branch destination determination portion 142 applies "1" to selector 141 if the processor number in the data packet and the content of PE# register 16 are in coincidence and "0" if there is no coincidence. Selector 141 provides the data packet to junction portion 12 if the output of branch destination determination portion 142 is "1", and to output processing portion 15 for "0".

FIG. 5 shows a more specific arrangement of conventional branch portion 14 together with portions associated with junction portion 12 and output processing portion 15. Referring to FIG. 5, branch portion 14 includes data transmission paths 72, 74 and 76 constituting a pipeline through which a data packet propagates and data latch circuits 54 and 56. The input side of data transmission path 72 is connected with a data latch circuit (not shown) in main body processing portion 13. Data transmission path 76 branches to be connected with the input of data latch circuit 60 in junction portion 12 and the input of data latch circuit 58 in output processing portion 15.

Branch portion 14 further includes transfer control elements 44 and 46 for controlling timings for latching data by data latch circuits 54 and 56. Similarly, junction portion 12 includes a transfer control element 50, and output processing portion 15 includes a transfer control element 48. Transfer control elements 44, 46, 48 and 50 generate clock pulses for controlling timings for latching data by data latch circuits 54, 56, 58 and 60, respectively, and provides the generated pulses to their corresponding data latch circuits. Each transfer control element 44, 46, 48 or 50 has an input for data hold signal CI, an output for data hold signal $\overline{CO}$, an input for an empty signal RI from a succeeding stage, and an output for an empty signal $\overline{RO}$ for a preceding stage. Transfer control elements 44, 46, 48 and 50 each control propagation of data on each data latch circuit by exchanging data hold signals $\overline{CO}$ and CI, and empty signal $\overline{RO}$ and RI with transfer control elements in preceding and succeeding stages.

Branch portion 14 further includes a coincidence determination circuit 42 for comparing a processor number in a data packet provided from main body processing portion 13 through data latch circuit 54 and the content of PE# register 16 and provides a signal indicating "1" if coincidence is found and "0" if no coincidence is found, an inverter 90 having its input connected to the $\overline{CO}$ output of transfer control element 46, an NAND circuit 82 having one input connected with the output of inverter 90 and the other input connected to the output of coincidence determination circuit 42 through data latch circuit 56, an inverter 92 having its input connected with the output of coincidence determination circuit 42 through data latch circuit 56, an NAND circuit 86 having two inputs connected to inverters 90 and 92, and an AND circuit 88 having two inputs connected to the outputs $\overline{RO}$ of transfer control elements 50 and 48. The output of NAND circuit 82 is connected with the input CI of transfer control element 50. The output of NAND circuit 86 is connected with the input CI of transfer control element 48.

The operation of branch portion 14 shown in FIG. 5 will briefly be described. Assume that a processor number in a data packet from main body processing portion 13 coincides with the content of PE# register 16. The output of coincidence determination circuit 42 then attains a high level. Assume that signals $\overline{CO}$ and $\overline{RO}$ output from transfer control elements 44, 46, 50 and 48 are all at a high level. In this case, empty signal RI to transfer control element 46 is at a high level. If empty signal RI from a succeeding stage is at a high level, the succeeding stage may receive data from a preceding stage. On the contrary, if empty signal RI from the succeeding stage is at a low level, the succeeding stage is not prepared to receive data.

If data hold signal CI from a preceding stage to transfer control element 46 falls to a low level, transfer control element 46 pulls empty signal $\overline{RO}$ to be applied to the preceding stage to a low level. In response to empty signal RI applied from transfer control element 46 attaining the low level, transfer control element 44 in the preceding stage pulls data hold signal $\overline{CO}$ to a high level. In response to data hold signal CI attaining the high level, transfer control element 46 raises clock pulse CP to data latch 56, and pulls empty signal $\overline{RO}$ to a low level. Data latch circuit 56 latches the outputs of data latch circuit 54 and coincidence determination circuit 42 in response to the rising of the clock pulse.

Transfer control element 46 pulls data hold signal $\overline{CO}$ to a low level in response to the rising of clock pulse CP. The output of inverter 90 is pulled from the low level to a high level. As described above, since the output of coincidence determination circuit 42 is at a high level, the output of NAND circuit 82 is pulled to a low level from the high level. Transfer control element 50 pulls empty signal $\overline{RO}$ from the high level to a low level in response to data hold signal CI attaining the low level.

Since the output of inverter 92 is at a low level, the output of NAND circuit 86 is always at a high level irrespectively of the output of inverter 90. Transfer control element 48 does not operate and its empty signal $\overline{RO}$ remains at the high level.

The output of AND circuit 88 attains a low level in response to the empty signal $\overline{RO}$ of transfer control element 50 attaining the low level. Transfer control element 46 pulls clock pulse CP to a low level in response to empty signal RI attaining the low level, and pulls data hold signal $\overline{CO}$ to a high level from the low level. Transfer control element 50, in response, raises a clock pulse to data latch circuit 60 in order to have the data latched, pulls empty signal $\overline{RO}$ once again to a high level, and therefore the empty signal RI of transfer control element 46 rises to a high level. At the time, transfer control element 48 does not operate. More specifically, in this case, data latched by data latch circuit 56 in branch portion 14 is latched only by data latch circuit 60 at junction portion 14, and is not latched by data latch circuit 58 in output processing portion 15.

If the output of coincidence determination circuit 42 indicates that there is no coincidence, in other words the value "0", the operation of each circuit within branch portion 14 is reversed from the above, the data of data latch circuit 56 is latched only by data latch circuit 58 in output processing portion 15, and is not latched by data latch circuit 60 in junction portion 12.

Based on a result of determination by coincidence determination circuit 42, branch portion 14 permits junction portion 12 and output processing portion 15 to selectively output data, and the data may be branched as a result.

FIG. 6 shows an example of an arrangement of a system using four data driven processors 61 for video processing. Referring to FIG. 6, the four processors 61 of the system are allocated with identification numbers PE#0, PE#1, PE#2 and P#3, respectively to uniquely identify the respective processors. The numbers 0 to 3 are stored in the PE registers 16 of processors 61 (see FIG. 3). Now, a description follows by specifying processors with the identification numbers allocated to respective processors 61.

In the system shown in FIG. 6, a network is formed so that a data packet may be provided to an arbitrary processor from another processor. Assume that a data packet is provided from processor PE#0 to processor PE#1. A data packet having processor number 124 shown in FIG. 2 set to the identification number of target processor PE#1 is output. The data packet is once provided to the input port IA of processor PE#3. The data packet is then output from the output port OA of processor PE#3 and provided to the input port IA of target processor PE#1.

In order to form such a network, the RM and RD of the branch control parameter register group for each processor are set as shown in FIG. 6. Determination of selection of an output portion in each processor is based on expression (1) given above.

In the example shown in FIG. 6, an output port in each processor is selected as follows.

In processor PE#0, if the least significant bit of processor number 124 in the output data packet is 1, output port OA is selected, and output port OB is selected otherwise. In processor PE#1, if the least significant bit of processor number 124 in data packet is 0, output port OA is selected, and output port OB is selected otherwise. In processors PE#2 and PE#3, if processor number 124 in the data packet is between 0 and 3, output port OA is selected and output port OB is selected otherwise. FIG. 7 shows a simple flow graph as an example to be executed by a data driven processor. The data flow graph shown in FIG. 7 is a program for finding a solution to y=(x+2) (x−1) for input data x.

Referring to FIG. 7, the data flow graph includes an input node 102, a copy node 104 duplicating data provided from input node 102 and branching it into two, a "+" node 106 for adding the data provided from copy node 104 with "2", a "−" node 108 subtracting 1 from data provided from copy node 104, a "*" node 110 for multiplying data provided from "+" node 106 and "−" node 108, and an output node 112 for receiving data provided from node 110. Based on the data flow graph, y=(x+2) (x−1) results at output node 112.

An example of an arrangement of a system executing the data flow graph is shown in FIG. 8. The arrangement shown in FIG. 8 uses one data driven processor 61 for video processing. Processor 61 is allocated with identification number PE#0. A description follows on the operation of processor PE#0 when the simple data flow graph shown in FIG. 7 is allocated to the processor.

A data packet storing an input value x is provided to the input port IA of processor PE#0. The processor number 124 (FIG. 2) of the data packet is the identification number of processor PE#0. An instruction code 122 shown in FIG. 2 is a copy instruction to copy node 104.

Referring to FIG. 3, the data packet is provided to input processing portion 17. Input processing portion 17 determines that the data packet is destined to its processor and provides the data packet to main body processing portion 13 through junction portion 12. In main body processing portion 13, a processing corresponding to "copy" node is executed by the input data packet, and the input data packet and its duplicate are output as a result. The node numbers of these packets indicate the "+" operation and "−" operation shown in FIG. 7, respectively. The processor numbers 124 of these data packets (see FIG. 2) both indicate processor PE#0.

The two data packets after the duplication are output from main body processing portion 13 and provided to branch portion 14. Branch portion 14 provides these data packets to junction portion 12, because both input data packets have processor numbers 124 (see FIG. 2) in coincidence with the content of PE# register 16. The data packets are once again provided to main body processing portion 13 and the "+" and "−" operations are executed.

The two data packets after the operations have both node numbers 126 (see FIG. 2) set to "*" node, and output from main body processing portion 13. Processor numbers 124 (see FIG. 2) are stored with a value indicating processor PE#0. The two data packets resulting from execution of "+" and "−" operations are both provided to branch portion 14 from main body processing portion 13.

Branch portion 14 provides these data packets to junction portion 12, because the input two data packets have processor numbers 124 in coincidence with its processor number. These data packets through junction portions 12 are once again provided to main body processing portion 13, matched as inputs at the left and right of "*" node and "*" operation is executed.

Main body processing portion 13 (see FIG. 3) is assume to be programmed so that a resultant data packet after execution of the "*" operation is provided with a processor number such as "PE#1". The data packet is provided from main body processing portion 13 to branch portion 14. Branch portion 14 provides the data packet to output processing portion 15, because the processor number 124 of the input data packet is not in coincidence with its processor number. Output processing portion 15 determines an output port based on the content set in the branch control parameter register group as described above. If the registers are set as shown in FIG. 8, in other words, if processor number 124 in the data packet is set to "PE#1", the data packet is output from output port OA.

If the data flow graph shown in FIG. 7 as described above is executed by the data driven processor shown in FIG. 8, output results are sometimes not correct. This may be because of mistakes in describing the data flow graph. In such a case, the data flow graph should be debugged.

As a conventional method of debugging the data flow graph, the data flow graph is revised to have an operation result under being executed be output, and thus obtained operation result under execution is checked if it is as expected up to the point. FIG. 9 shows a revised version of the data flow graph shown in FIG. 7 for debugging.

Referring to FIG. 9, in the revised example, results of "+" and "−" operations are both output externally from processor PE#0. More specifically, as shown in FIG. 9, the data flow graph is revised and two output nodes 114 and 116 for debugging are newly provided. The output of "+" node 106 and the output of "−" node 108 are output separately from "*" node 110 to these outputs for debugging 114 and 116.

Thus, as shown in FIG. 10, data packets from output nodes 114 and 116 are output to output port OV, and the contents of the data packets may be checked. The respective results output externally from the processor are compared with their expected values, in order to check which part of the data flow graph has an error.

Since the example shown in FIG. 7 is a very simple data flow graph, it is not difficult to revise for debugging. Data flow graphs for use in practical purposes are far more complicated, and it is usually difficult to know the intermediate result of which part should be output to facilitate debugging. A data flow graph is often revised a number of times without success in order to obtain an intermediate result facilitating debugging. The efficiency of debugging such a data flow graph has been low in the conventional system, and construction of the system requires a long period of time.

SUMMARY OF THE INVENTION

It is an object of the present invention to provide a data driven information processor capable of readily and efficiently debugging a data flow graph.

Another object of the invention is to provide a data driven information processor facilitating switching between the operation of readily and efficiently debugging a data flow graph in testing and usual operation other than testing.

A still further object of the invention is to provide a data driven information processor capable of readily outputting an operation result under execution.

An additional object of the present invention is to provide a data driven information processor capable of externally outputting the content of a data packet only internally circulating, which is not usually available, without changing a data flow graph.

The data driven information processor according to the present invention includes an input processing portion for receiving a data packet; an output processing portion for outputting a data packet; a main body processing portion for processing the data packet input through the input processing portion; a register for storing information used in determining the data packet output from the main processing portion should continue to be processed in the main processing portion or should be output externally; and a branch portion receiving the data packet output from the main body processing portion and branching the data packet to the input and output processing portions of the main processing portion based on the content of the data packet and the information stored in the register. The branch portion can produce a duplicate of a data packet for application to the output processing portion at the time of branching the data packet.

A data packet input through the input processing portion is processed in the main body processing portion. The branch portion receives the data packet output from the main body processing portion and branches the data packet to the input and output processing portions of the main processing portion based on the content of the data packet and the information stored in the register. The branch portion produces a duplicate of the data packet upon branching the data packet for application to the output processing portion.

The content of an internally circulating data packet which cannot be usually known may be externally output without changing the data flow graph, and therefore the result of operation under execution may readily externally accessed. As a result, the data flow graph may readily and efficiently be debugged.

The data driven information processor preferably further includes a duplication designation terminal for receiving an externally applied duplication designation signal for designating whether or not to produce a duplicate of a data packet, and the branch portion produces a duplicate of a data packet upon branching the data packet for application to the output processing portion if the duplication designation signal for designating producing of the duplicate of the data packet is applied from the duplication designation terminal.

The branch portion may include a branch destination determination portion for outputting a control signal based on the content of a data packet, a duplication designation signal for designating producing of a duplicate of the data packet provided from the duplication designation terminal and information stored in the register, and a selector including a first output terminal connected to the main body processing portion, a second output terminal connected to the output processing portion and a third output terminal connected to both the main body processing portion and the output processing portion for providing a data packet provided from the main body processing portion to one of the three output terminals in response to the control signal.

The branch portion produces a duplicate of the data packet for application to the output processing portion upon branching the data packet to the junction portion, if the duplication designation signal for designating producing of a duplicate of the data packet is provided from the duplication designation terminal.

Meanwhile, if the duplication designation signal designates that a duplicate of a data packet will not be produced from the duplication designation terminal, such a duplicate of the data packet is not produced upon branching the data packet to the junction portion.

Therefore, switching between operations in testing for readily and efficiently debugging the data flow graph and usual operation otherwise may readily be achieved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Now, embodiments of the invention will be described in detail.

Figure 1:
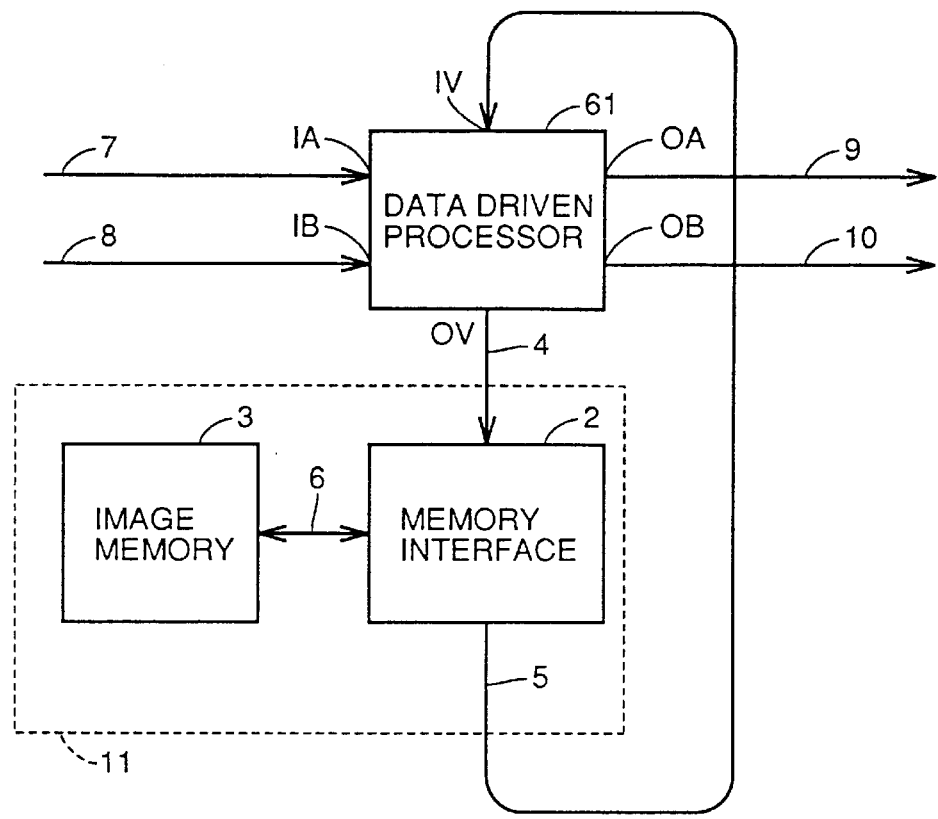
FIG. 1 is a block diagram showing a data driven information processing system for video processing including a conventional data driven processor.
Figure 2:
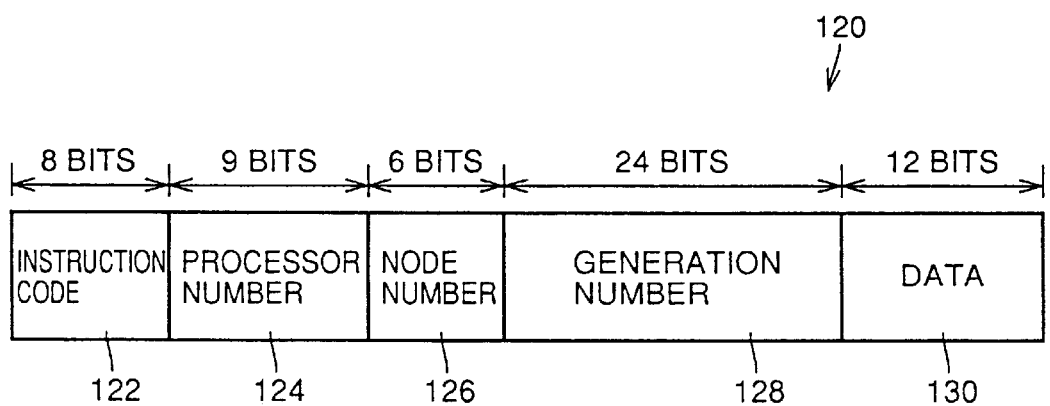
FIG. 2 is a diagram schematically showing the field configuration of a data packet.
Figure 11:
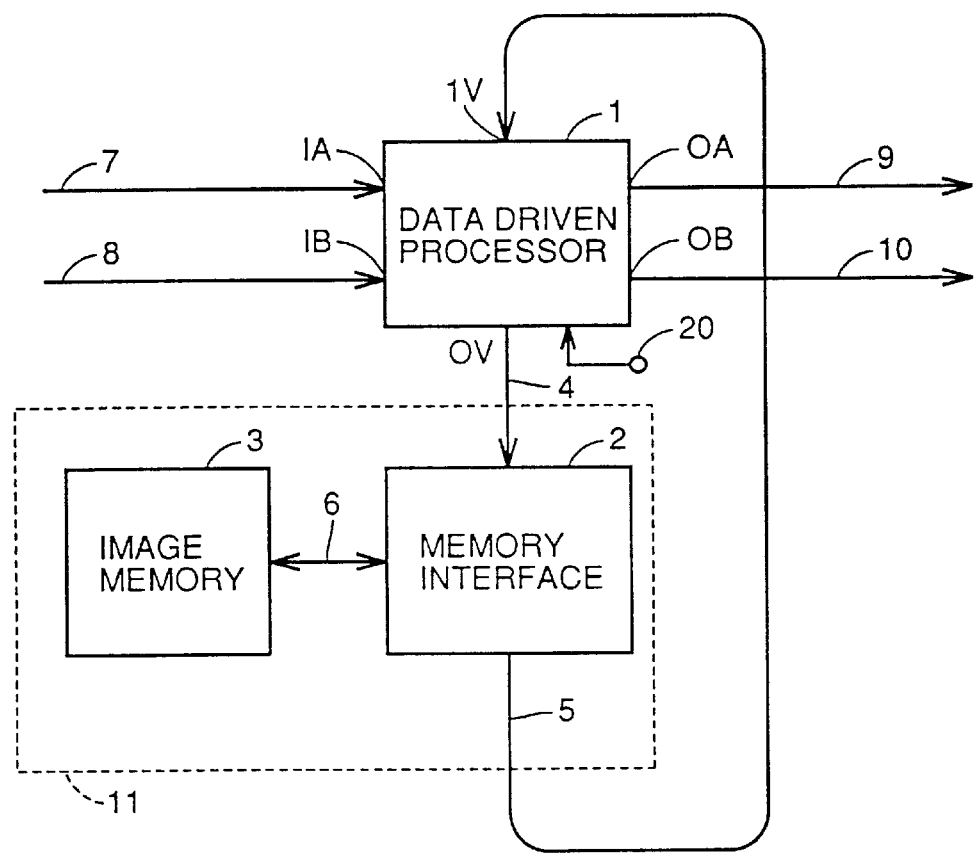
FIG. 11 is a block diagram showing a data driven information processor for video signal processing including a data driven processor according to a first embodiment of the invention.

FIG. 11 is a block diagram showing a data driven information processing system for video signal processing including a data driven processor 1 according to a first embodiment of the invention. The system shown in FIG. 11 is substantially the same as the system using a conventional data driven processor 61 shown in FIG. 1 with a difference being that data driven processor 1 according to the present invention is used in place of data driven processor 61. Therefore, while a detailed description follows on data driven processor 1, the other portion will not be detailed here.

As shown in FIG. 11, data driven processor 1 is provided with a duplication designation terminal 20 for applying a duplication designation signal to externally set if the processor is operated in a debug mode or in a usual operation mode. The following preferred embodiments operate in the same manner as conventional data driven processor 61 shown in FIGS. 1 and 3, if duplication designation terminal 20 is set to "0". If duplication designation terminal 20 is set to "1", data driven processor 1 produces a duplicate of a data packet which would be conventionally processed only inside data driven processor 1 and outputs the duplicate to one of output ports OA and OB. The configuration necessary for such operation will be detailed in conjunction with FIG. 12.

Figure 3:
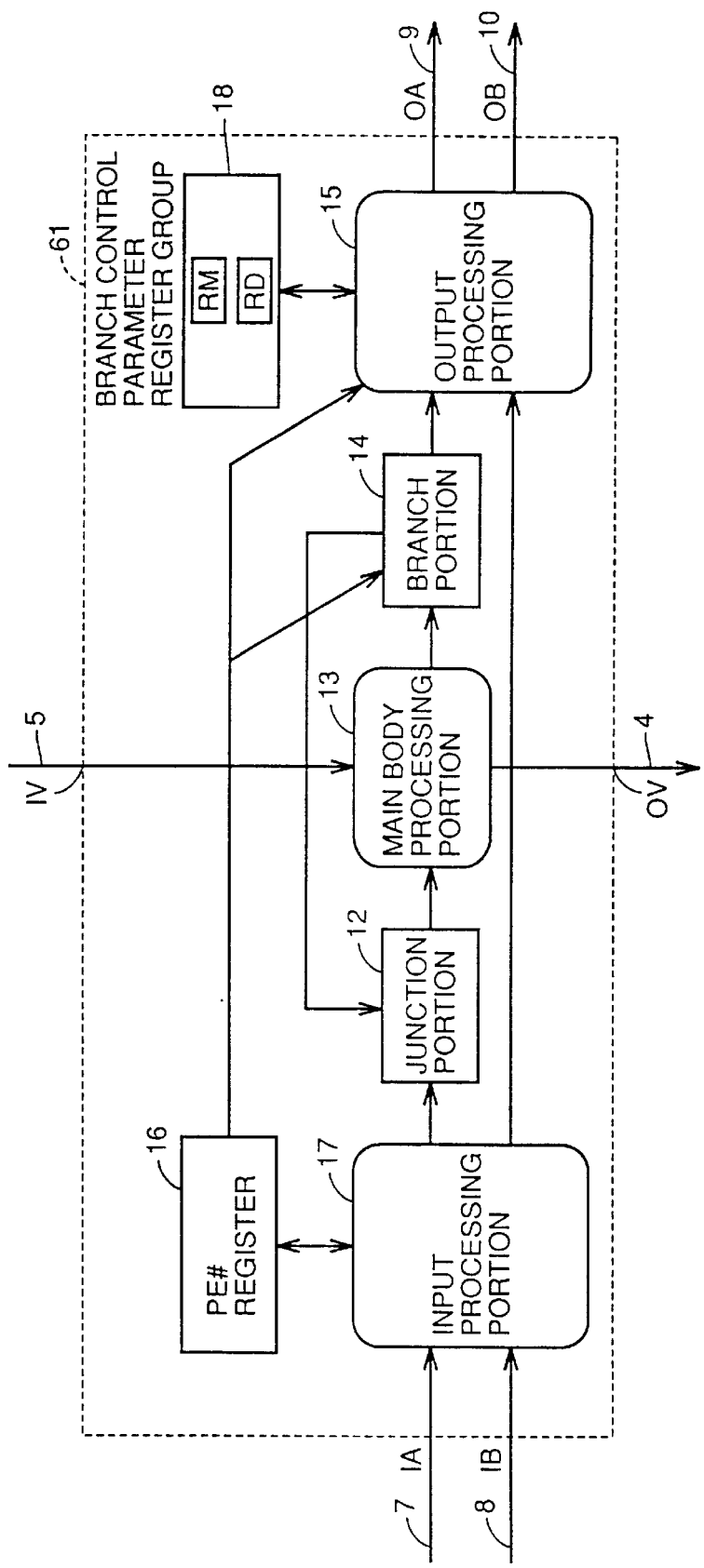
FIG. 3 is a block diagram showing a conventional data driven processor.
Figure 4:
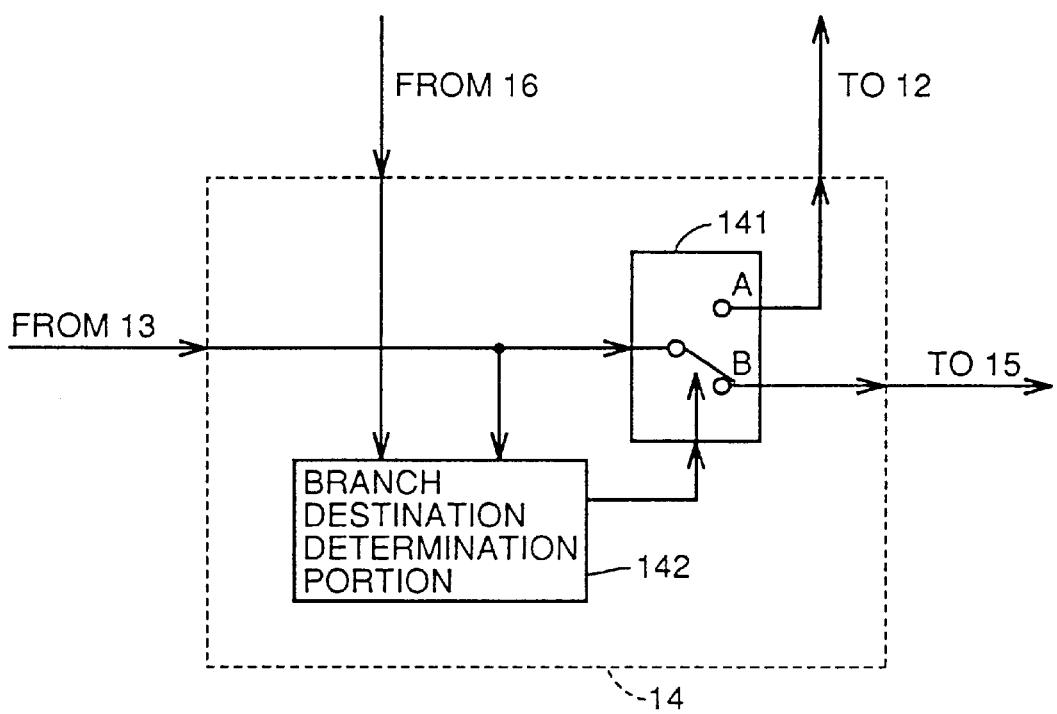
FIG. 4 is a functional block diagram showing a branch portion in a conventional data driven processor.
Figure 12:
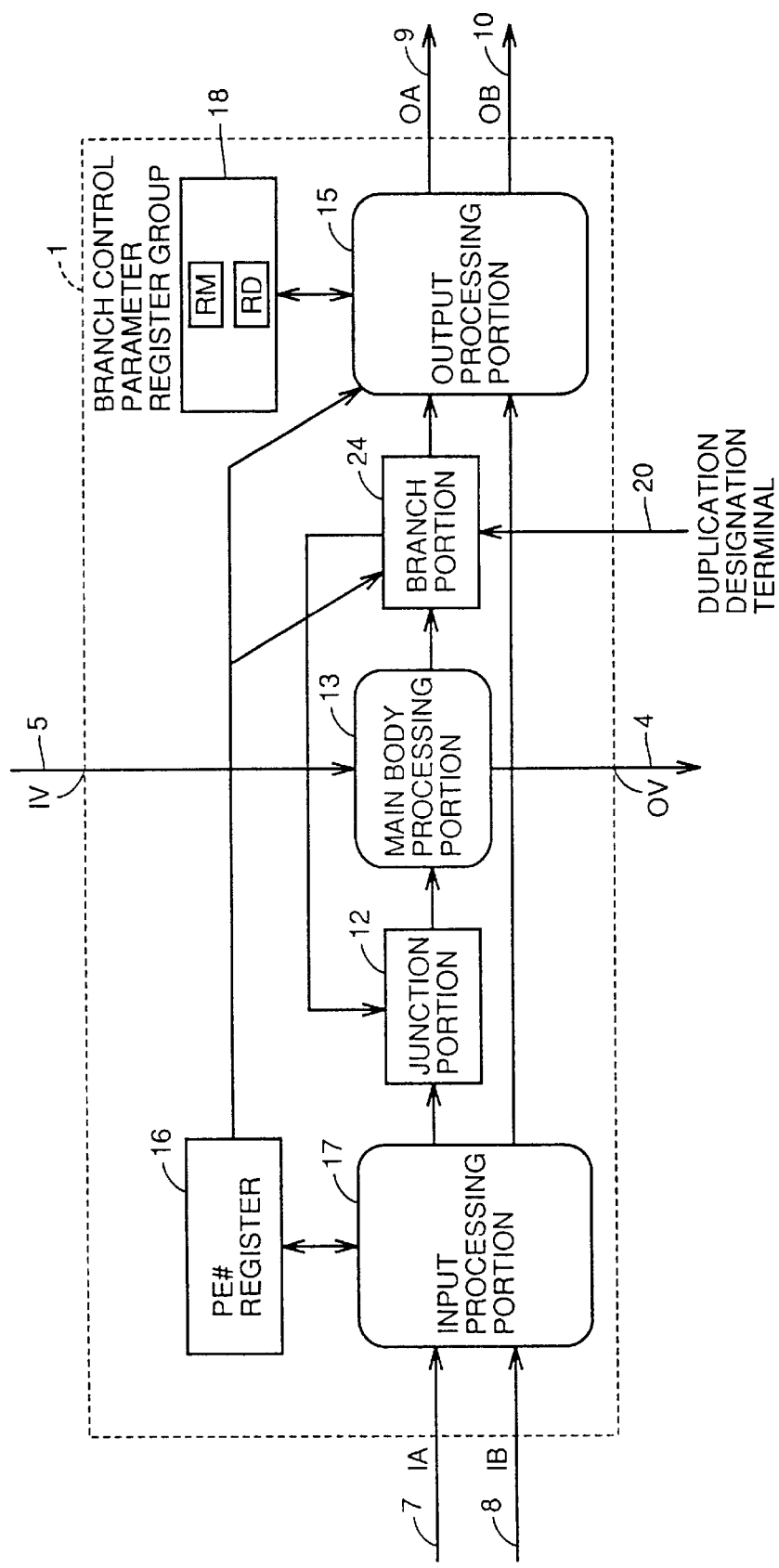
FIG. 12 is a block diagram showing the data driven processor according to the first embodiment of the invention.
Figure 13:
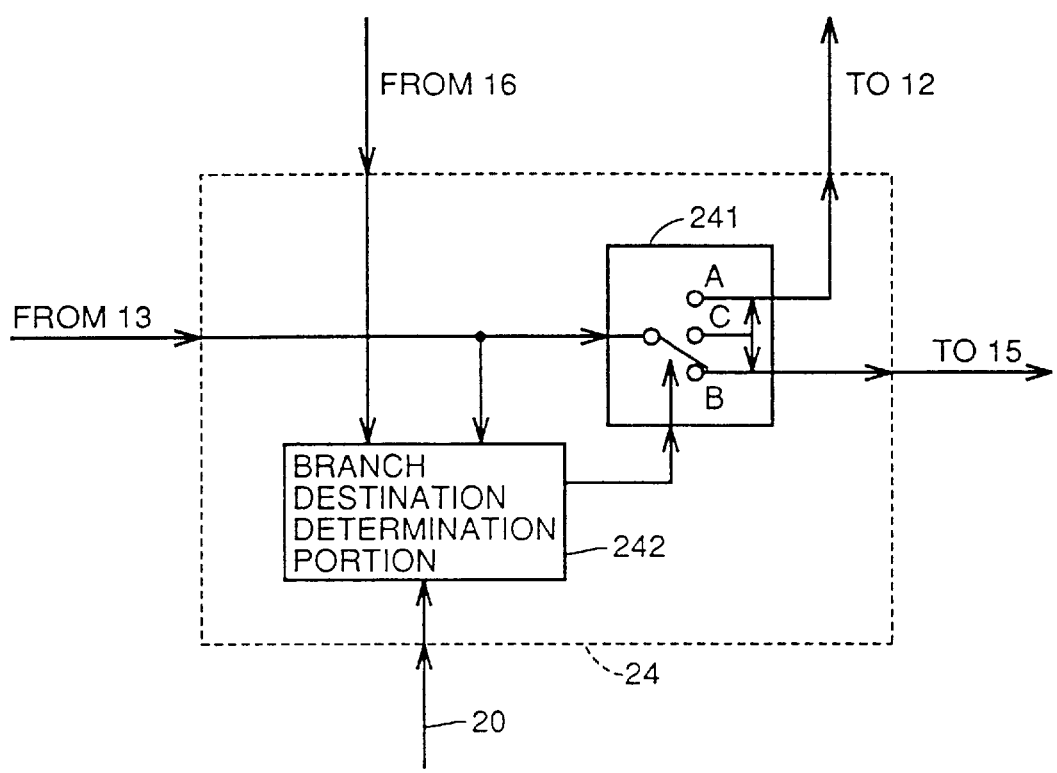
FIG. 13 is a diagram schematically showing the functional configuration of a branch portion in the data driven processor shown in FIG. 2.

Referring to FIG. 12, data driven processor 1 according to the first embodiment of the invention is substantially identical to the conventional data driven processor 61 shown in FIG. 3, but branch portion 24 switchably performing operation in a debug mode and usual operation in response to a duplication designation signal from duplication designation terminal 20 is included in place of branch portion 14 shown in FIG. 3. The configuration of the other portion of data driven processor 1 is the same as that of the conventional data driven processor 61. In FIGS. 12 and 3, corresponding parts are denoted with the same reference numerals and characters and are not detailed here.

Figure 14:
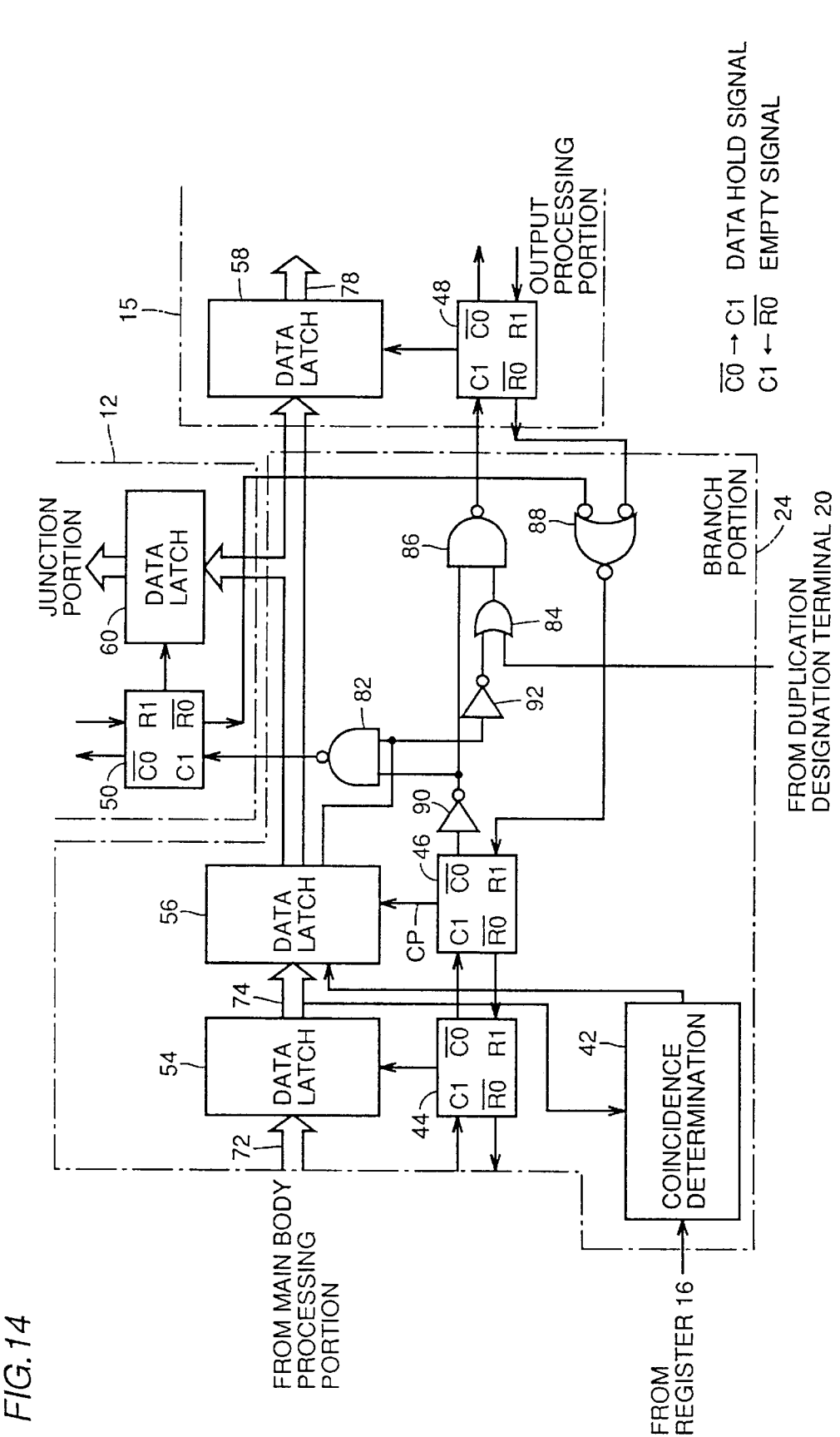
FIG. 14 is a circuit block diagram more specifically showing the configuration of the branch portion.

Branch portion 24 functionally includes a selector 241 functionally having an output terminal A connected to junction portion 15, an output terminal B connected to output processing portion 12 and an output terminal C connected to both junction portion 12 and output processing portion 15 for providing a data packet provided from main body processing portion 13 to one of these three output terminals in response to a control signal, and a branch destination determination portion 242 connected to duplication designation terminal 20 and operating to control selector 241 to provide a data packet from main body processing portion 13 to output terminal C if duplication designation terminal 20 is set to 1, and operating similarly to branch destination determination portion 142 shown in FIG. 14 if duplication designation terminal 20 is set to 0.

By the function of branch portion 24, if duplication designation terminal 20 is set to 1, a data packet provided from main body processing portion 13 is provided to both junction portion 12 and output processing portion 15. If duplication designation terminal 20 is set to 0, the processor number of a data packet provided from main body processing portion 13 is compared with the content of PE# register 16. If coincidence is found, the data packet is provided to junction portion 12 through output terminal A, and it no coincidence is found, the data packet is provided to output processing portion 15 through output terminal B.

Figure 5:
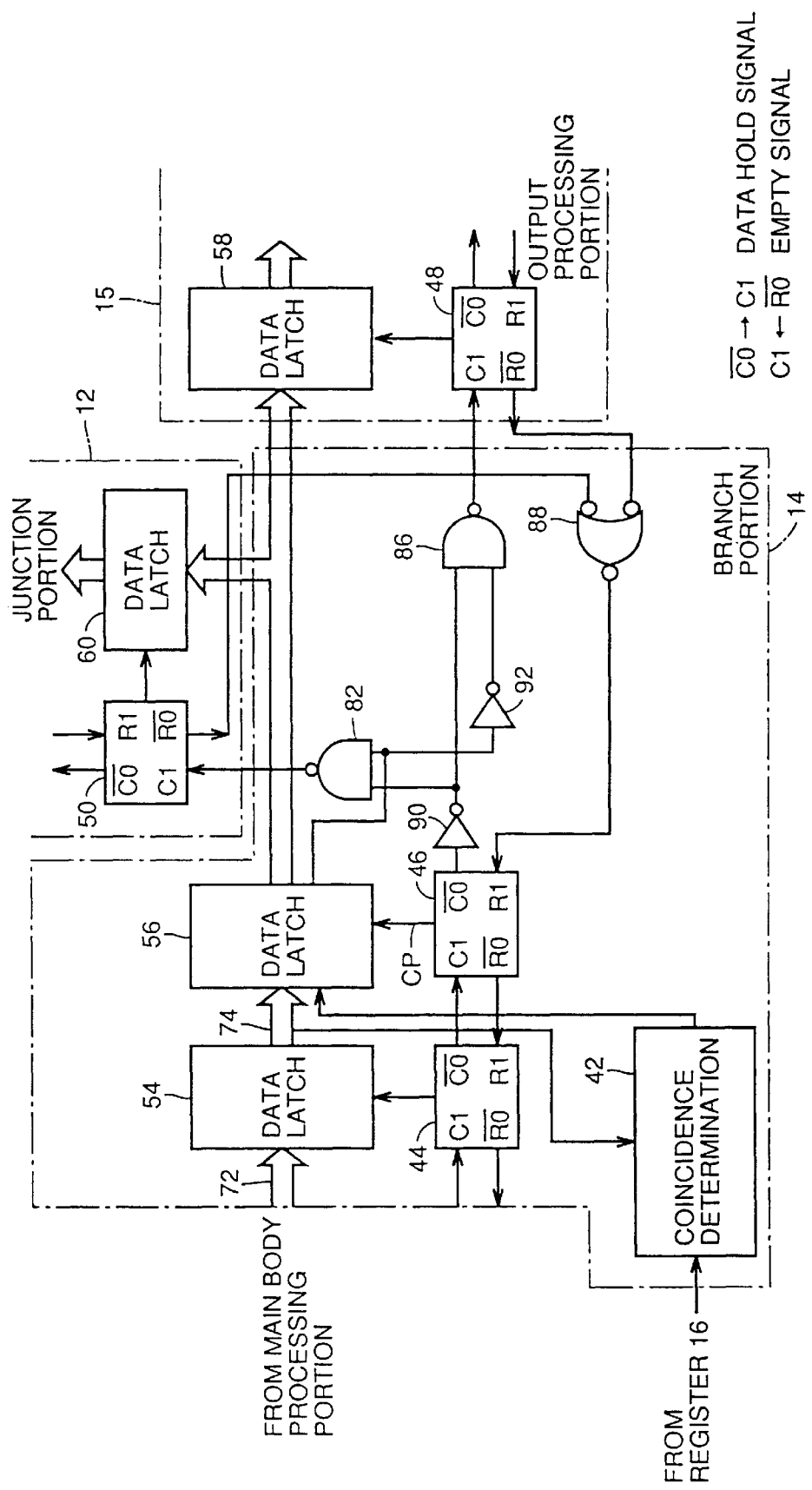
FIG. 5 is a circuit diagram showing a branch portion in a conventional data driven processor.
Figure 6:
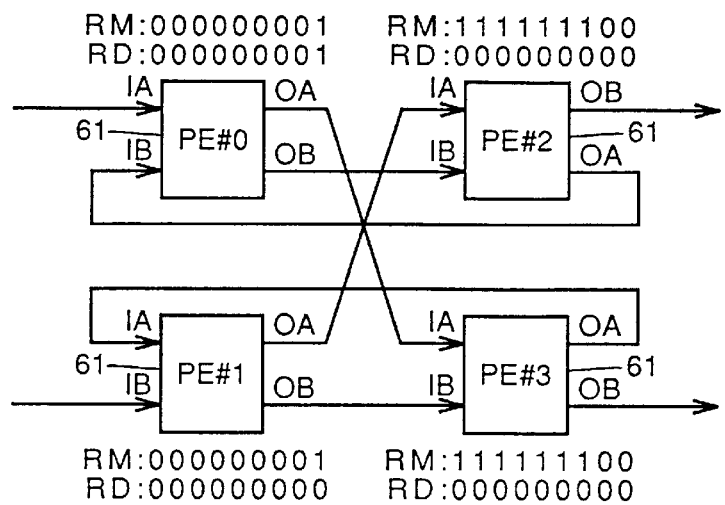
FIG. 6 is a diagram showing a system including four data driven processors.
Figure 7:
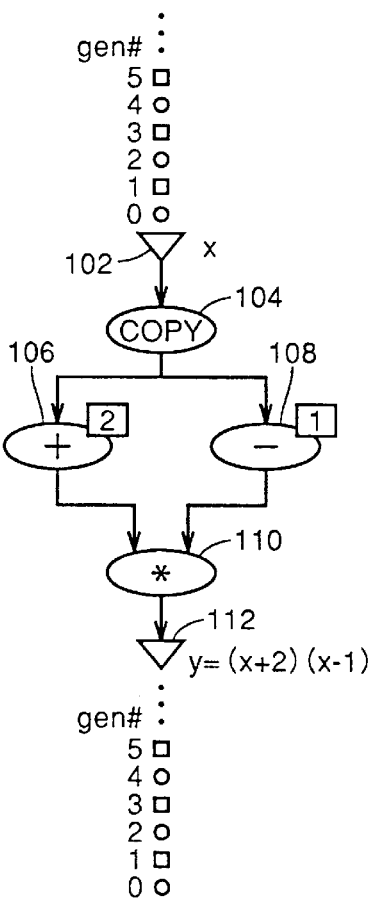
FIG. 7 is a diagram showing an example of a data flow graph.
Figure 8:
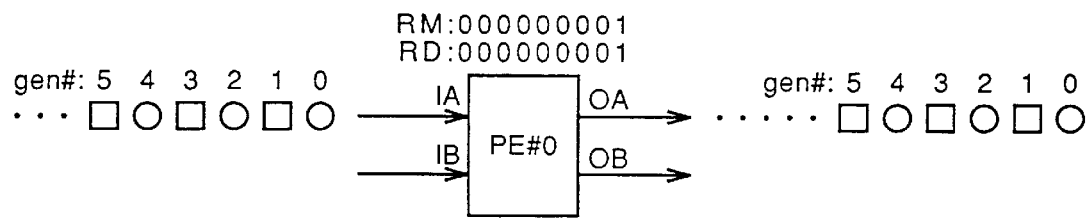
FIG. 8 is a diagram showing how a data packet is output by a conventional processor.
Figure 9:
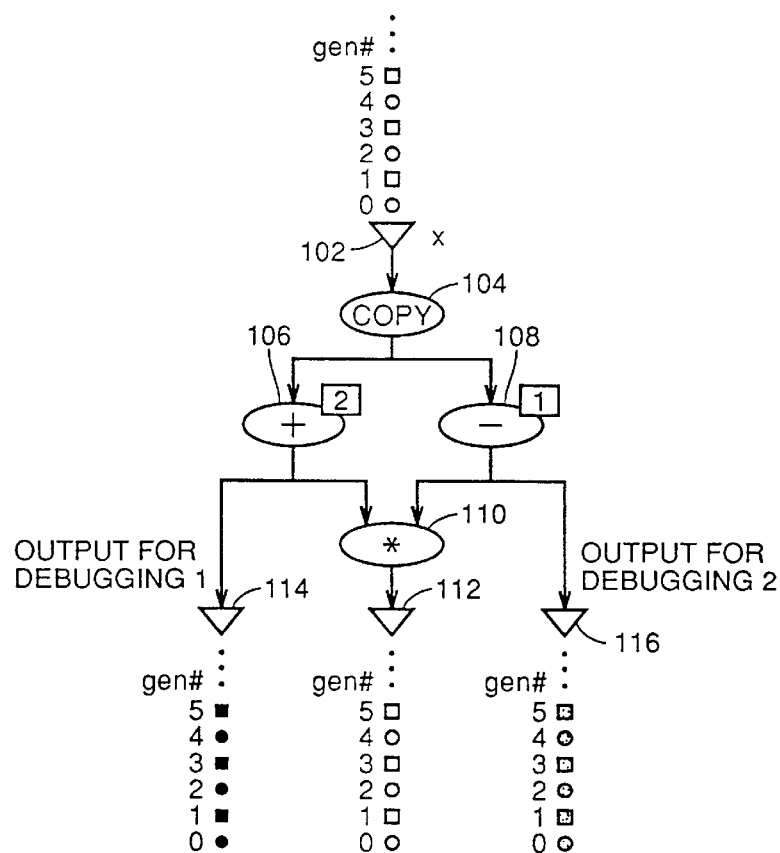
FIG. 9 is a diagram schematically showing a data flow graph revised for debugging.
Figure 10:
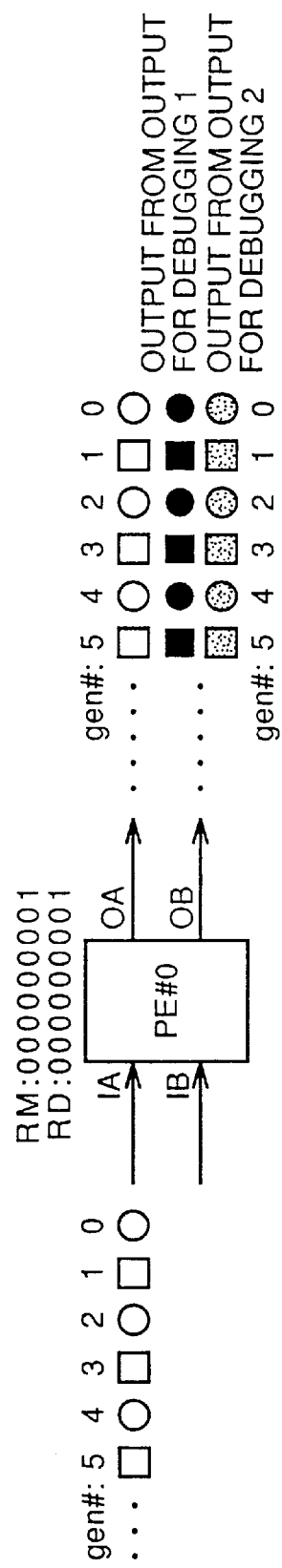
FIG. 10 is a diagram schematically showing how a data packet is output if a data flow graph revised for debugging in a conventional data driven processor is executed.

The configuration of branch portion 24 for use in data driven processor 1 according to the first embodiment of the invention shown in FIG. 12 is more specifically shown in FIG. 14 together with part of junction portion 12 and output processing portion 15. In FIGS. 14 and 5, the same parts are denoted with the same reference numerals, characters and names, and their functions are identical, which are not therefore detailed here.

Branch portion 24 shown in FIG. 14 is different from conventional branch portion 14 shown in FIG. 5 in that an OR circuit 84 is interposed between the output of inverter 92 and the input of NAND circuit 86. The other input of OR circuit 84 is connected to duplication designation terminal 20. The output of OR circuit 84 is connected to the input of NAND circuit 86. The other portion of branch portion 24 shown in FIG. 14 is entirely the same as the conventional branch portion 14 shown in FIG. 5.

The provision of OR circuit 84 permits branch portion 24 to operate in a debug mode if duplication designation terminal 20 is set to 1, and to operate similarly as conventional branch portion 14 if duplication designation terminal 20 is set to 0. In the debug mode, if a data packet is branched toward junction portion 20, a duplicate of the data packet is output to output processing portion 15. Now, the operation will be described.

Referring to FIG. 14, assume that duplication designation terminal 20 is set to 0. In this case, it is clear that branch portion 24 operates in the entirely same manner as branch portion 14 shown in FIG. 5. First, assume that the processor number 124 of the data packet provided from main body processing portion 13 is in coincidence with the content of PE# register 16. In this case, the output of coincidence determination circuit 42 attains a high level (FIG. 15 at (B)), and therefore the output of inverter 92 attains a low level (FIG. 15 at (C)). Since duplication designation terminal 20 is set to a low level, the output of OR circuit 84 attains a low level.

Figure 15:
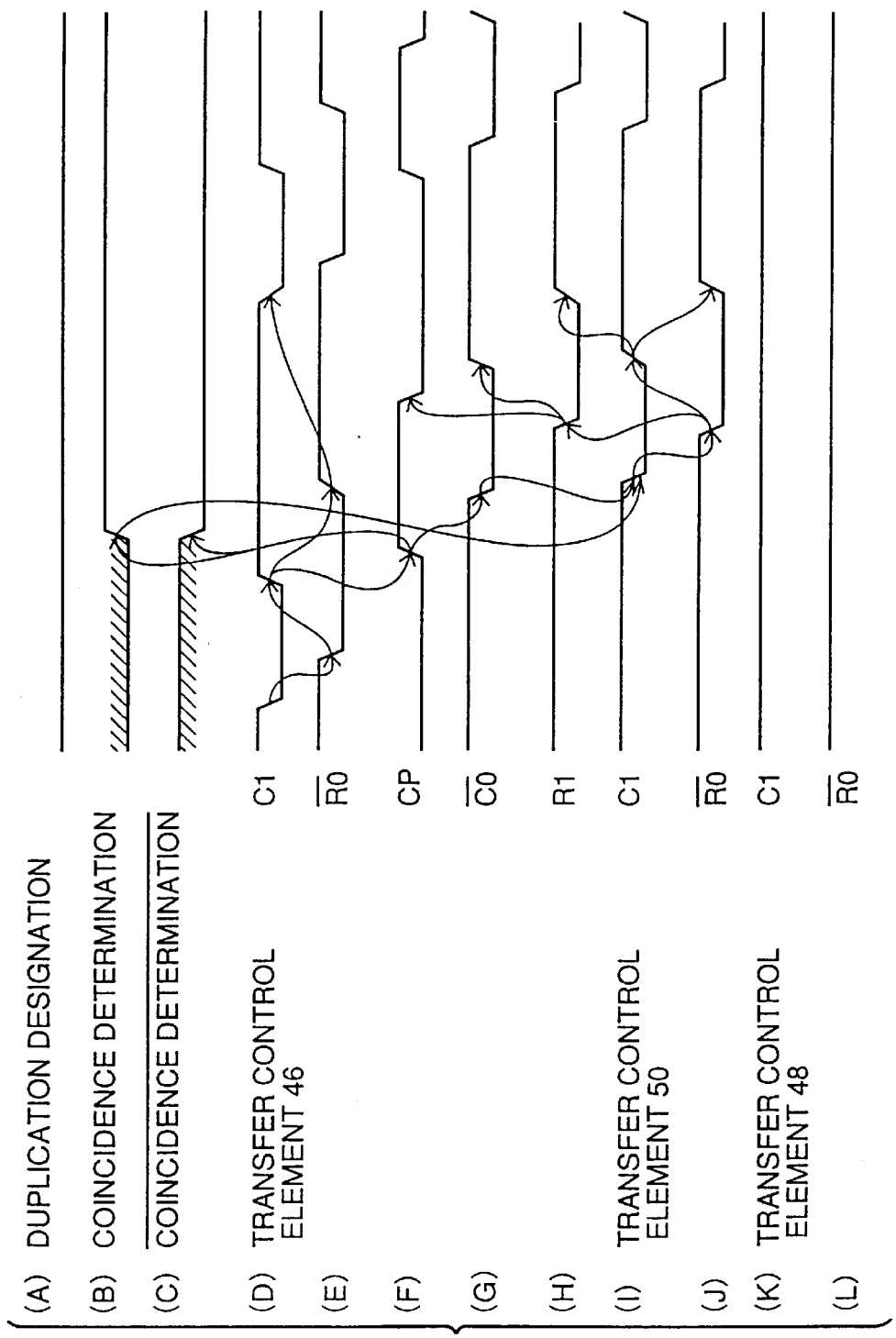
FIG. 15, FIG. 16, FIG. 17, and FIG. 18 are timing charts for use in illustration of the operation of the branch portion.

As shown in FIG. 15, assume that data hold signal CI and empty signal RI input to transfer control element 46 as an initial state and data hold signal $\overline{CO}$ and empty signal $\overline{RO}$ output from transfer control element 46 are all at a high level. At the time, data hold signal CI to transfer control element 50 and empty signal $\overline{RO}$ from transfer control element 50 are also at a high level. Data hold signal CI to transfer control element 48 and empty signal $\overline{RO}$ from transfer control element 48 are at a high level. Signal CP from transfer control element 46 to data latch 56 is at a low level.

As shown in FIG. 15 at (D), data hold signal CI to transfer control element 46 falls from the high level to a low level. In response, transfer control element 46 pulls empty signal $\overline{RO}$ to transfer control element 44 from the high level to a low level. (FIG. 15 at (E)). In response, transfer control element 44 pulls data hold signal $\overline{CO}$ output therefrom (data hold signal CI to transfer control element 46) once again to a high level.

Transfer control element 46 provides a clock pulse CP to data latch 56 in response to data hold signal CI being pulled to the high level. In other words, clock pulse CP from transfer control element 46 to data latch circuit 56 rises to a high level (FIG. 15 at (F)). Transfer control element 46 also pulls empty signal $\overline{RO}$ from transfer control element 44 once again to a high level (FIG. 15 at (E)).

In response to clock pulse CP being raised to the high level, transfer control element 46 pulls data hold signal $\overline{CO}$ to a succeeding stage from the high level to a low level (FIG. 15 at (G)). A signal provided from coincidence determination circuit 42 to NAND circuit 82 through data latch circuit 56 is at a high level, and therefore NAND circuit 82 provides the change of the output of transfer control element 46 as is to the transfer control element 50 of junction portion 12 as data hold signal CI (FIG. 15 at (I)).

Since a low level signal is provided to NAND circuit 86 from duplication designation terminal 20, and the output of inverter 92 is at a low level, the output of NAND circuit 86 remains to be at the high level (FIG. 15 at (K)).

Transfer control element 50, as shown in FIG. 15 at (J), pulls empty signal $\overline{RO}$ output therefrom from the high level to a low level (FIG. 15 at (F)), and provides a clock pulse for data latch to data latch circuit 60. Thus, latch data in data latch data 50 is transferred to data latch circuit 60. Meanwhile, data latch circuit 58 does not operate.

If empty signal $\overline{RO}$ output from transfer control element 50 changes from the high level to a low level, empty signal RI to transfer control element 46 also changes from the high level to a low level (FIG. 15 at (H)). Transfer control element 46 pulls clock pulse CP once again to a low level in response to the input empty signal RI being pulled from the high level to the low level, and pulls data hold signal $\overline{CO}$ output therefrom to a high level (FIG. 15 at (G)). Thus, data hold signal CI provided to transfer control element 50 rises from the low level to a high level (FIG. 15 at (I)). As a result, empty signal $\overline{RO}$ output from transfer control element 50 rises once again to a high level (FIG. 15 at (J)).

Then, a coincidence determination to a next data packet is conducted by coincidence determination circuit 42, data hold signal CI to transfer control element 46 is pulled to a low level, and the next transfer cycle is initiated.

Figure 16:
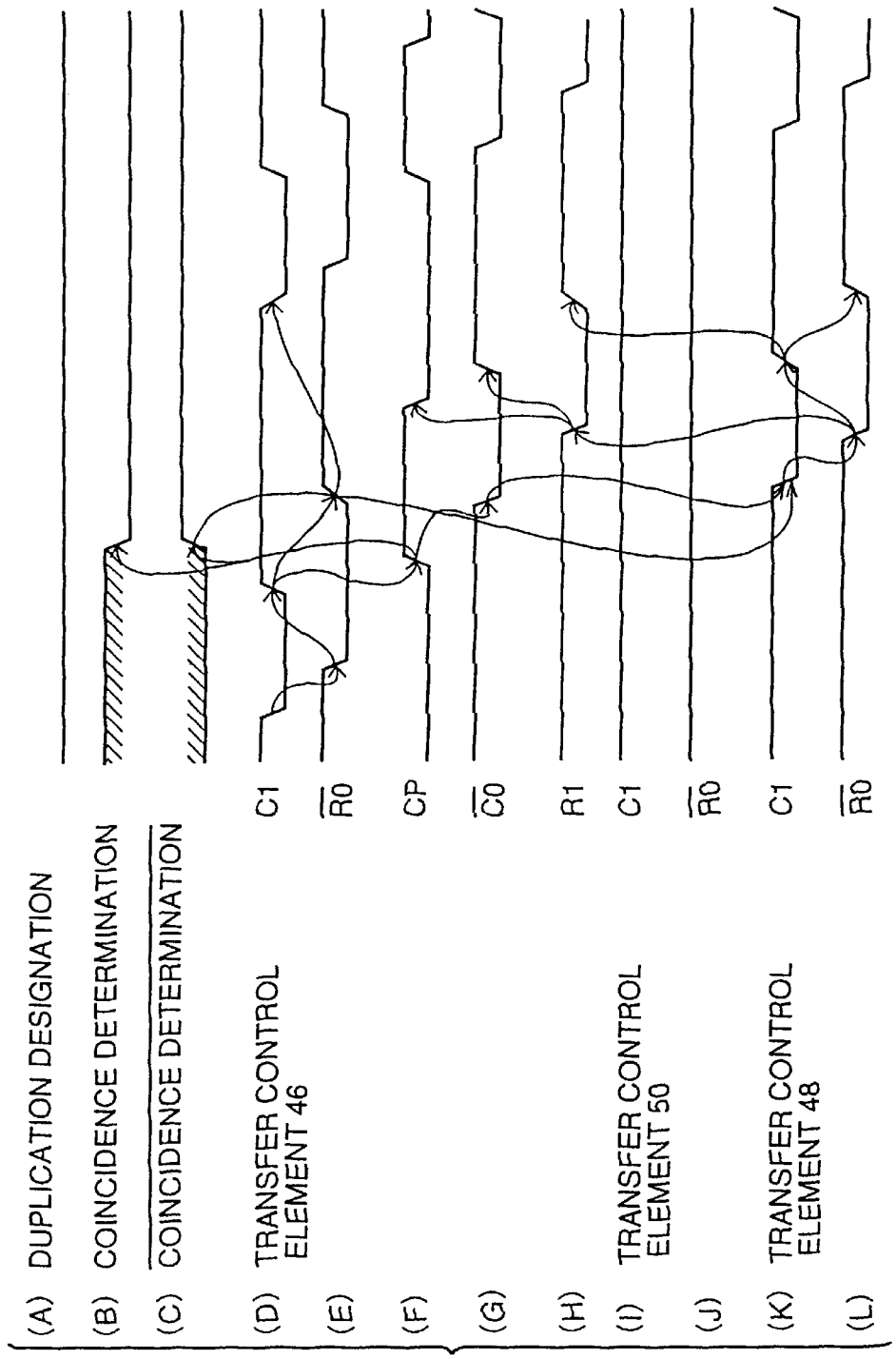

Referring to FIG. 16, the operation of branch portion 24 will be described if the processor number of a data packet provided from main body processing portion 13 and the content of PE# register 16 are determined not in coincidence in coincidence determination circuit 42. In this case, the output of coincidence determination circuit 42 is at a low level, and therefore, the output of inverter 92 is at a high level. Since the output of inverter 92 is at the high level, a signal provided from OR circuit 84 to NAND circuit 86 attains a high level. Therefore, NAND circuit 86 provides the change of the waveform of data hold signal $\overline{CO}$ as is provided from transfer control element 46 through inverter 90 to transfer control element 48 in the next stage as data hold signal CI.

Meanwhile, a signal provided from coincidence determination circuit 42 through data latch circuit 56 to NAND circuit 82 is at a low level. NAND circuit 82 therefore provides data hold signal CI at a high level to the transfer control element 50 of junction portion 12 irrespectively of the value of data hold signal $\overline{CO}$ output from transfer control element 46. The change of the waveform of data hold signal $\overline{CO}$ from transfer control element 46 is therefore not propagated to transfer control element 50.

As a result, although the waveforms in FIG. 16 at (A) to (H) are not different from corresponding waveforms in FIG. 15, transfer control element 50 does not perform any transfer control operation as shown in FIG. 16 at (I) and (J). Data latch circuit 60 in junction portion 12 will not therefore latch data in data latch circuit 56. As shown in FIG. 16 at (K) and (L), only data latch circuit 58 in output processing portion 15 receives data in data latch circuit 56, and therefore the data packet is output only to output processing portion 15.

Therefore, in this case, the data packet is output only to output processing portion 15 and is not provided to junction portion 12.

Now, the case in which duplication designation terminal 20 is set to "1" will be considered.

First, assume that the processor number of a data packet provided from main body processing portion 13 and the content of PE# register 16 are in coincidence. In this case, the output of coincidence determination circuit 42 is at a high level, and the output of inverter 92 is at a low level.

Although the output of inverter 92 is at the low level, the output of OR circuit 84 is always at a high level, because duplication designation terminal 20 is set to 1.

Figure 17:
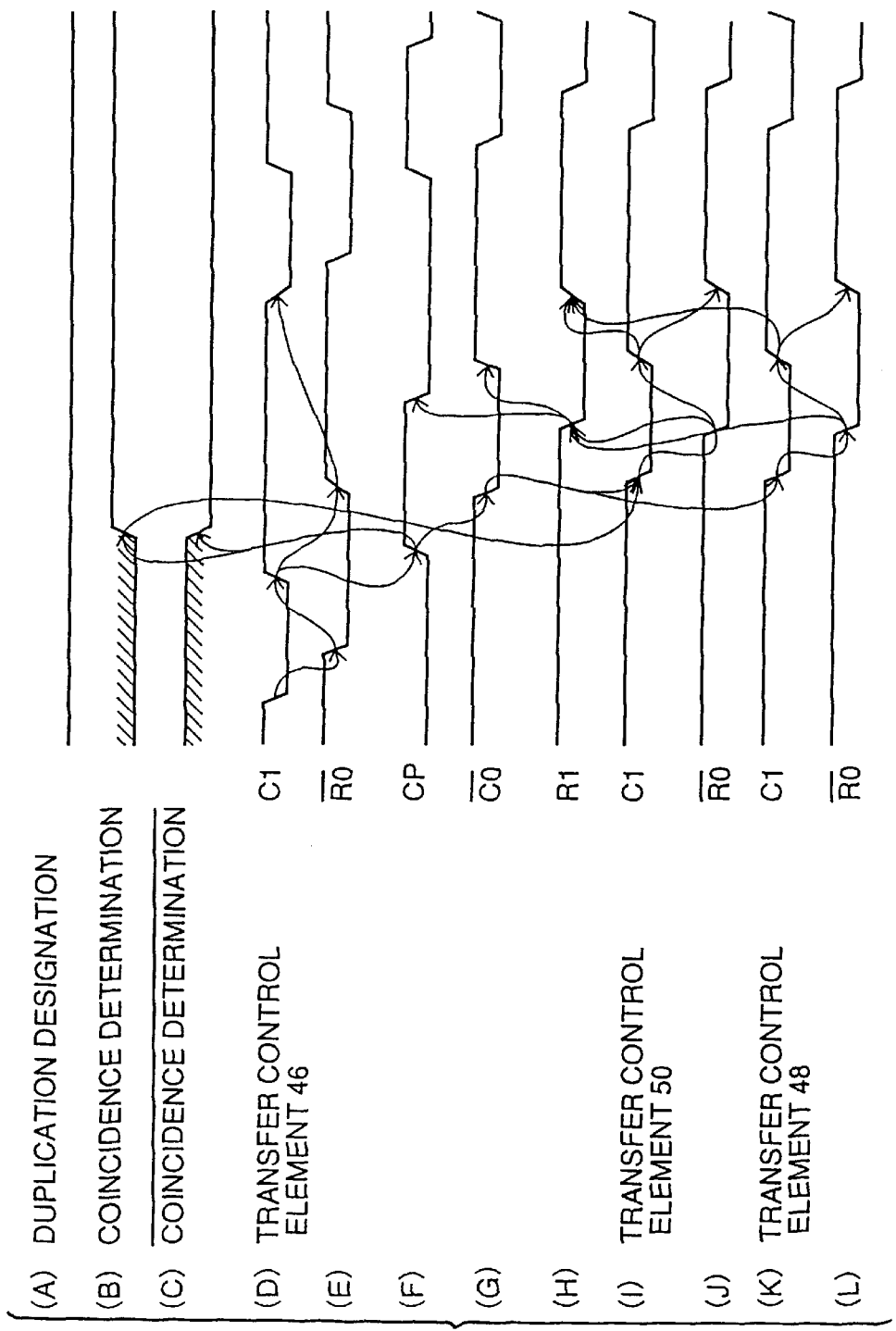

As shown in FIG. 17, assume that data hold signal CI and empty signal RI input to transfer control element 46 as an initial state and data hold signal $\overline{\text{CO}}$ and empty signal $\overline{\text{RO}}$ output from transfer control element 46 are all at a high level. At the time, data hold signal CI to transfer control element 50 and empty signal $\overline{\text{RO}}$ from transfer control element 50 are also at a high level. Data hold signal CI to transfer control element 48 and empty signal $\overline{\text{RO}}$ from transfer control element 48 are at a high level. A clock pulse CP from transfer control element 46 to data latch circuit 56 is at: a low level.

As shown in FIG. 17 at (D), data hold signal CI to transfer control element 46 falls from the high level to a low level. In response, transfer control element 46 pulls empty signal $\overline{\text{RO}}$ to transfer control element 44 from the high level to a low level (FIG. 17 at (E)). Then, in response, transfer control element 44 pulls data hold signal $\overline{\text{CO}}$ output therefrom (data hold signal CI to transfer control element 46) once again to a high level (FIG. 17 at (D)).

Transfer control element 46 provides clock pulse CP to data latch circuit 56 in response to data hold signal CI being pulled to the high level. In other words, clock pulse CP from transfer control element 46 to data latch 56 rises to a high level (in FIG. 17 at (F)). Transfer control element 46 also pulls empty signal $\overline{\text{RO}}$ to transfer control element 44 once again to a high level (FIG. 17 at (E)).

In response to clock pulse CP being raised to the high level, transfer control element 46 pulls data hold signal $\overline{\text{CO}}$ to a succeeding stage from the high level to a low level (FIG. 17 at (G)). A signal provided from coincidence determination circuit 42 to NAND circuit 82 is at the high level, and therefore NAND circuit 82 provides the change of the output of transfer control element 46 as is to transfer control element 50 in junction portion 12 as data hold signal CI (FIG. 17 at (I)).

Since a signal at a high level is provided from duplication designation terminal 20 to NAND circuit 86, NAND circuit 86 also provides the change of the waveform of data hold signal $\overline{\text{CO}}$ output from transfer control element 46 as is to transfer control element 48 in output processing portion 15 as data hold signal CI (FIG. 17 at (K)).

Transfer control elements 48 and 50, as shown in FIG. 17 at (J) and (L), pulls empty signals $\overline{\text{RO}}$ output therefrom from the high level to a low level (FIG. 17 at (J) and (L)) and provides clock pulses for data latch to data latch circuits 58 and 56, respectively. Thus, latch data in data latch circuit 56 is transferred to data latch circuits 58 and 60.

If one of empty signals $\overline{\text{RO}}$ output from transfer control elements 48 and 50 changes from the high level to a low level, empty signal RI to transfer control element 46 also changes from the high level to a low level (FIG. 17 at (H)). Transfer control element 46 pulls clock pulse CP once again to a low level in response to the input empty signal RI being pulled from the high level to the low level (FIG. 17 at (F)), and also raises data hold signal $\overline{\text{CO}}$ output therefrom to a high level (FIG. 17 at (G)). Thus, data hold signals CI provided to transfer control elements 50 and 48 rise from the low level to a high level (FIG. 17 at (I) and (K)). As El result, empty signals $\overline{\text{RO}}$ output from transfer control elements 48 and 50 once again rises to a high level (FIG. 17 at (J) and (L)).

Then, a coincidence determination by coincidence determination circuit 42 is conducted to a next data packet and data hold signal CI to transfer control element 46 is pulled to a low level (FIG. 17 at (D)), thus initiating the next transfer cycle.

Now, referring to FIG. 18, the operation of branch portion 24 will be described if the processor number of a data packet provided from main body processing portion 13 and the content of PE# register 16 are not in coincidence in coincidence determination circuit 42. In this case, the output of coincidence determination circuit 42 is at a low level, and therefore the output of inverter 92 is at a high level. Since the output of inverter 92 is at the high level, a signal provided from OR circuit 84 to NAND circuit 86 is also at a high level. NAND circuit 86 therefore provides the change of the waveform of data hold signal $\overline{\text{CO}}$ provided from transfer control element 46 as is to transfer control element 48 as data hold signal CI.

Meanwhile, a signal provided to NAND circuit 82 from coincidence determination circuit 42 is at a low level. NAND circuit 82 therefore provides data hold signal CI at a high level to transfer control element 50 in junction portion 12 irrespectively of the value of data hold signal $\overline{\text{CO}}$ output from transfer control element 46. The change of the waveform of data hold signal $\overline{\text{CO}}$ from transfer control element 46 is not propagated to transfer control element 50.

Figure 18:
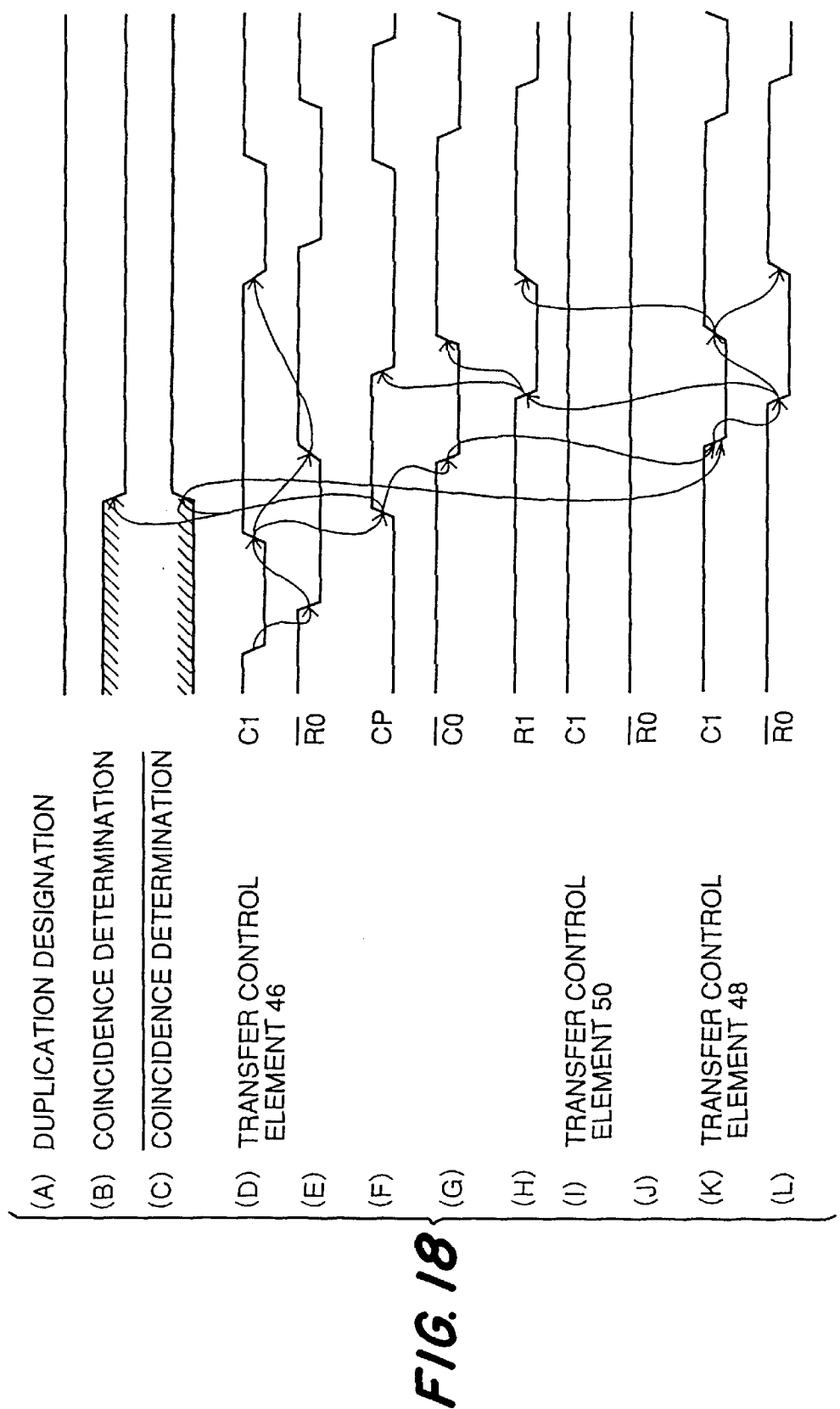

As a result, the waveforms shown in FIG. 18 at (A) to (H) and at (K) and (L) are not different from corresponding waveforms shown in FIG. 17 but as shown in FIG. 18 at (I) and (J), transfer control element 50 does not perform any transform control operation. Data latch circuit 60 in junction portion 12 therefore will not latch data in data latch circuit 56. Only data latch circuit 58 receives data in data latch circuit 56, and therefore, the data packet is output only to output processing portion 15.

In other words, in this case, the data packet is output only to output processing portion 15 and is not provided to junction portion 12.

As described above, if the processor number of a data packet from main body processing portion 13 is in coincidence with the content of PE# register 16 in coincidence determination circuit 42, the data packet is provided to junction portion 12 and its duplicate is also provided to output processing portion 15. The data packet provided to output processing portion 15 may be considered as a duplicate of a data packet determined to be processed once again at main body processing portion 13, and therefore, the processor number 124 of the data packet is in coincidence with the content of PE# register 16. Also as described above, output processing portion 15 determines an output port based on the content set in the branch control parameter register group and the content of a data packet.

Figure 19:
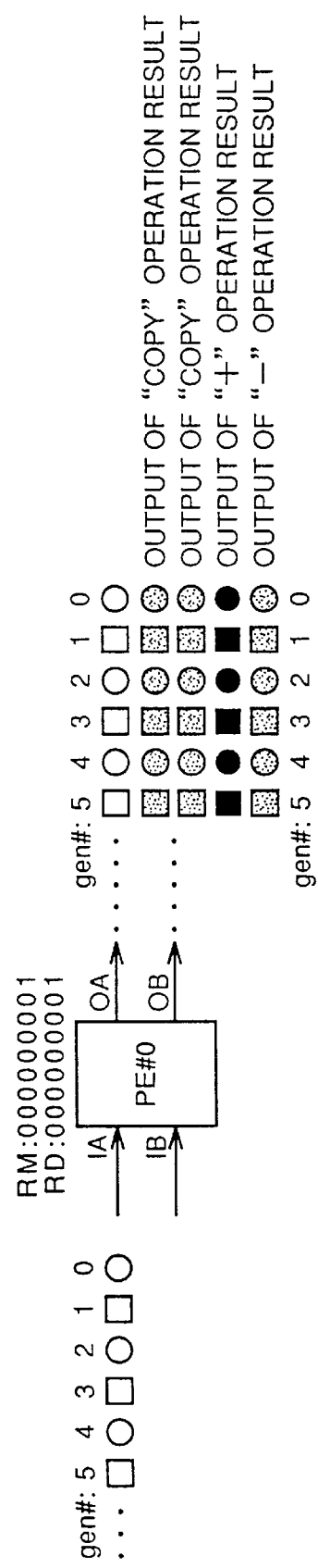
FIG. 19 is a diagram schematically showing how a data packet is output by the data driven processor according to the first embodiment of the invention.

If branch control parameter registers RM and RD are set to "00000001" as shown in FIG. 19, and a data flow graph shown in FIG. 17 is executed by processor PE#0, data packets as shown in FIG. 19 are output from processor PE#0. In this case, the processor number of a data packet duplicated by branch portion 24 is set to PE#0. These data packets are therefore output from output port OB.

As described above, in the data driven processor according to the first embodiment, if a data packet output from main body processing portion 13 is once again provided to main body processing portion 13 for processing, a duplicate of the data packet is output externally from the processor. These data packets are intermediate operation results in the data flow graph, the content of which cannot be conventionally confirmed from the outside of the processor unless the data flow graph is changed for debugging. By the data driven processor according to the first embodiment as described above, however, the content of the intermediate result may be confirmed from the outside of the processor without revising the data flow graph. Comparing the content with an expected value prepared facilitates debugging of the data flow graph. Since the data flow graph does not have to be revised, such debugging may efficiently be conducted. Furthermore, after the debugging is completed, setting duplication designation terminals 20 to 0 keeps a data packet from being output for the above-described debugging, and therefore the same operation as by the conventional data driven processor may be conducted. Stated differently, the operation in the debug mode and the usual operation mode may readily be switched.

The value to which duplication designation terminal 20 is set according to the first embodiment is information necessary for validating or invalidating duplication designation to externally output a duplicate of a data packet circulating only within the data driven processor as described above. The setting may be conducted by using a built-in register provided in the data driven processor as well as such an external terminal as duplication designation terminal 20. A data driven processor 100A according to a second embodiment of a data driven information processor of the present invention which includes such a duplication designation register is shown in FIG. 20 in the form of a block diagram.

Figure 20:
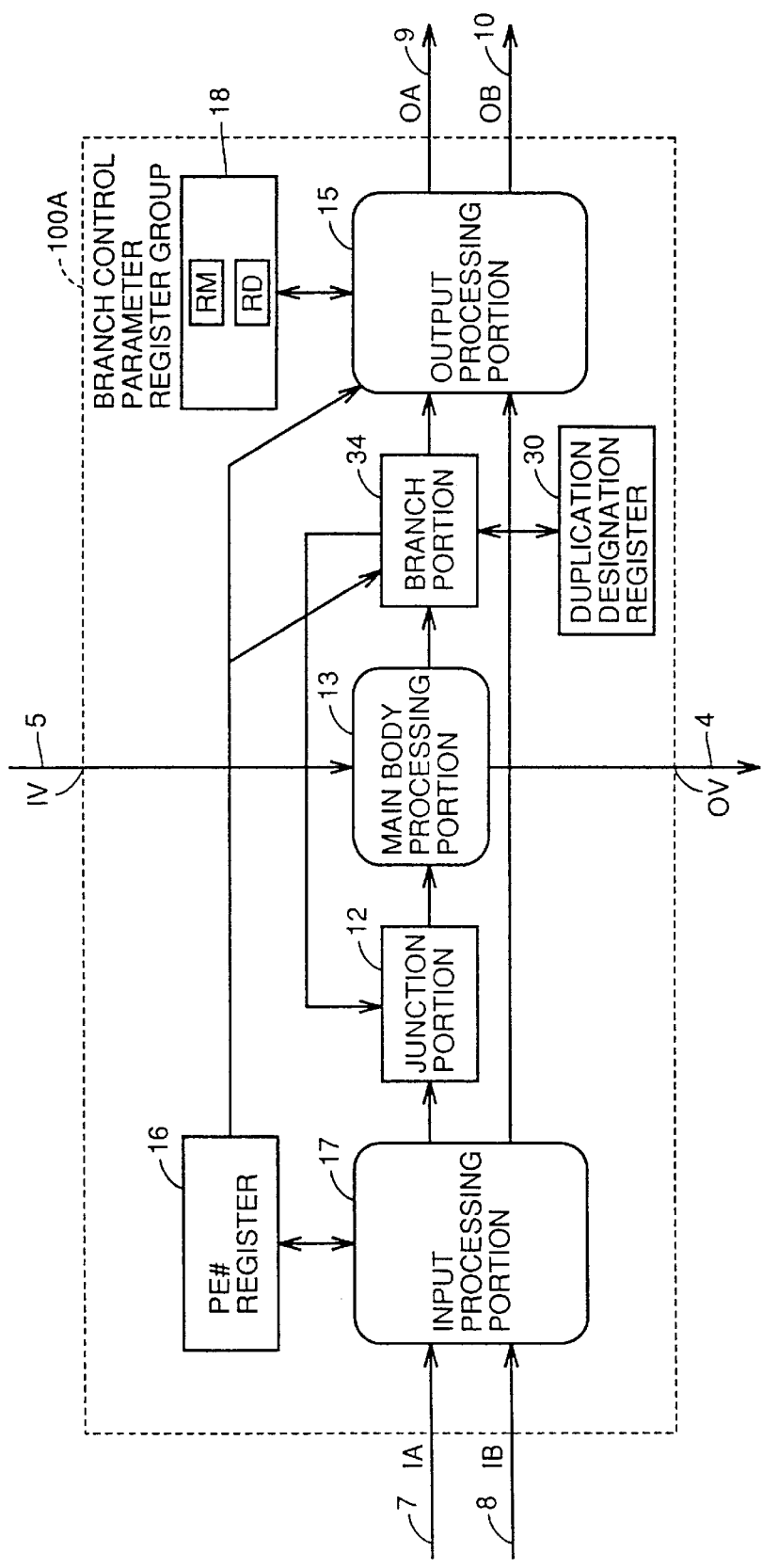
FIG. 20 is a block diagram showing a data driven processor according to a second embodiment of the invention.

Referring to FIG. 20, data driven processor 100A is provided with duplication designation register 30 in addition to the configuration of data driven processor 1 shown in FIG. 12, and includes a branch portion 34 capable of updating and reference processing with respect to duplication designation register 30 in place of branch portion 24.

Branch portion 34 has a configuration substantially identical to branch portion 24 shown in FIGS. 12 and 14 with a difference being that the function of storing the value in duplication designation register 30 in response to a particular instruction is further provided.

The value of duplication designation register 30 may be set by software upon initializing the data driven processor. If set to 0, for example, duplication designation register 30 performs the same operation as the conventional data driven processor shown in FIG. 3. If duplication designation register 30 is set to 1, a duplicate of a data packet circulating within data driven processor 100A is externally output from output processing portion 15 for use in debugging. The operations of branch portions 34 and output processing portion 15 are substantially the same as those described in conjunction with the first embodiment, and therefore are not detailed here.

In the data driven processors according to the preferred embodiments of the invention, branch portions 24 and 34 provide a data packet to main body processing portion 13 through junction portion 12 for continuous operation therein, and a duplicate of the data packet is externally output through output processing portion 15. Therefore, an intermediate result in the course of processing may be confirmed externally, and compared with an expected value, which facilitates debugging of the data flow graph. Upon debugging, the data flow graph does not have to be revised as have been conventionally conducted, and therefore efficient debugging may be performed. If duplication designation terminal 20 and duplication designation register 30 are set to a value indicating usual operation, they may be readily be switched to the operation the same as that conventionally conducted.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data driven information processor, comprising:
input means for receiving a data packet;
output means for outputting a data packet;
processing means for processing the data packet input through said input means in accordance with a data flow graph to obtain an intermediate data packet;
storage means for storing information for use in determining whether to continue to process the intermediate data packet obtained by said processing means or to output the intermediate data packet externally through said output means; and
branch means for receiving the intermediate data packet resulting from said processing means and for branching the intermediate data packet to the input of said processing means or to said output means based on the content of the intermediate data packet and the information stored in said storage means, said branch means, during a debugging mode used to determine whether the flow graph is operating properly, producing a duplicate of the intermediate data packet when the intermediate data packet is branched to the input of said processing means and providing the duplicate to said output means.

2. The data driven information processor as recited in claim 1, further comprising:
duplication designation means for outputting a duplication designation signal which, during a debugging mode, instructs said branch means to produce a duplicate of the intermediate data packet,
said branch means producing a duplicate of the intermediate data packet when the data packet is branched and providing the duplicate to said output means if said duplication designation means outputs a duplication designation signal to designate production of the duplicate.

3. The data driven information processor as recited in claim 2, wherein
said branch means includes;
branch destination determination means for outputting a control signal based on the content of the intermediate data packet, the state of the duplication designation signal output by said duplication designation means, and the information stored in said storage means, and
a selector having a first output terminal connected to said processing means, a second output terminal connected to said output means, and a third output terminal connected to both said processing means and said output means for providing an intermediate data packet provided from said processing means to one of these three output terminals in response to the control signal.

4. The data driven information processor as recited in claim 3, wherein
said branch destination determination means includes coincidence determination means for outputting a result of determination based on the content of the intermediate data packet and the information stored in said storage means,
said branch destination means outputting the control signal in response to an output of said coincidence determination means and the duplication designation signal.

5. The data driven information processor as recited in claim 4, further comprising:

junction means for joining the data packet provided from said input means and the intermediate data packet provided from said branch means for application to said processing means, wherein
said selector includes;
a transfer control element outputting a timing signal for determining a timing of data latch in communication with respective transfer control elements of said processing means, said junction means, and said output means,
data latch means for, in response to the timing signal output by said transfer control element, latching the intermediate data packet provided from said processing means and providing the latched intermediate data packet to said junction means and said output means,
first logic means for receiving a data hold signal output of said transfer control element and an output of said coincidence determination means for outputting a data hold signal to said junction means, and
second logic means for receiving a data hold signal output of said transfer control element, an output of said coincidence determination means, and the duplication designation signal for outputting a data hold signal to said output means.

6. The data drive information processor as recited in claim 2, further comprising:
memory means for holding the duplication designation signal.

7. A method for controlling a data driven information processor, the data driven information processor having a memory unit which stores processor identification data, said method comprising the steps of:
inputting a data packet into the data driven processor;
processing the received data packet in accordance with a data flow graph stored in the data driven processor to obtain an intermediate data packet; and
selectively sending the intermediate data packet resulting from said processing step to a unit within the data driven processor for additional processing or to an external output, wherein
during a debugging mode in which the data flow graph used to process input data packets is tested, the intermediate data packet resulting from said processing step is duplicated so that the intermediate data packet is sent both to the external output and to the unit within the data driven processor for additional processing, so that it can be determined whether the data flow graph used in said processing step is correct based on the intermediate data packet resulting from obtained processing step.

8. The method according to claim 7, wherein the data flow graph debugging mode is initiated by a duplication designation signal input to the data driven processor.

9. The method according to claim 7, wherein the data flow graph debugging mode is initiated by a duplication designation signal stored in a memory unit which is part of the data driven processor.

10. The method according to claim 7, wherein said step of selectively sending the intermediate data packet to the unit for additional processing or to the external output is performed by comparing a processor ID number stored in the memory unit of the data driven processor with a processor ID number included in the intermediate data packet.

* * * * *